United States Patent
Sato et al.

(10) Patent No.: US 11,155,465 B2
(45) Date of Patent: Oct. 26, 2021

(54) CROSS-LINKED STRUCTURE OF CARBON MATERIAL AND METHOD FOR PRODUCING SAME

(71) Applicant: STELLA CHEMIFA CORPORATION, Osaka (JP)

(72) Inventors: Yoshinori Sato, Izumiotsu (JP); Kazutaka Hirano, Izumiotsu (JP); Yuki Kikui, Izumiotsu (JP)

(73) Assignee: Stella Chemifa Corporation, Osaka (JP)

( * ) Notice: Subject to any disclaimer, the term of this patent is extended or adjusted under 35 U.S.C. 154(b) by 127 days.

(21) Appl. No.: 15/563,698

(22) PCT Filed: Apr. 22, 2016

(86) PCT No.: PCT/JP2016/062716
§ 371 (c)(1),
(2) Date: Oct. 2, 2017

(87) PCT Pub. No.: WO2016/171239
PCT Pub. Date: Oct. 27, 2016

(65) Prior Publication Data
US 2018/0072574 A1 Mar. 15, 2018

(30) Foreign Application Priority Data

Apr. 22, 2015 (JP) ................ JP2015-087641

(51) Int. Cl.
*C01B 32/168* (2017.01)
*B82Y 30/00* (2011.01)
(Continued)

(52) U.S. Cl.
CPC ............ *C01B 32/168* (2017.08); *B82Y 30/00* (2013.01); *B82Y 40/00* (2013.01); *C01B 32/05* (2017.08);
(Continued)

(58) Field of Classification Search
CPC ...... C01B 32/168; C01B 32/156; C01B 32/18; C01B 32/194; C01B 32/21; C01B 32/28;
(Continued)

(56) References Cited

U.S. PATENT DOCUMENTS 6,332,916 B1 12/2001 Chinn et al.
6,835,366 B1 * 12/2004 Margrave ................. B01J 21/18
423/447.1

(Continued)

FOREIGN PATENT DOCUMENTS

CN 103276593 A 9/2013
CN 103459011 A 12/2013
(Continued)

OTHER PUBLICATIONS

Hof, et al., Brominated single walled carbon nanotubes as versatile precursors for covalent functionalization, Chem. Commun. 2014 ; 50: 6582-6584 (Year: 2014).*

(Continued)

*Primary Examiner* — Daniel C. McCracken
(74) *Attorney, Agent, or Firm* — Knobbe Martens Olson & Bear LLP

(57) ABSTRACT

A cross-linked structure of a carbon material is excellent in mechanical strength, such as tensile strength. The carbon materials such as carbon nanotube, graphite, fullerene, and carbon nanocoil, are cross-linked with each other. The carbon materials are cross-linked through a linking group derived from a nucleophilic compound having two or more nucleophilic groups in the molecule.

6 Claims, 7 Drawing Sheets

CNTs

Nu, Nu' : Nucleophilic group
R: Body part of nucleophilic compound

(51) Int. Cl.
    *C01B 32/05* (2017.01)
    *C01B 32/156* (2017.01)
    *C01B 32/18* (2017.01)
    *C01B 32/194* (2017.01)
    *C01B 32/21* (2017.01)
    *C01B 32/28* (2017.01)
    *C01B 32/354* (2017.01)
    *B82Y 40/00* (2011.01)

(52) U.S. Cl.
    CPC ............ *C01B 32/156* (2017.08); *C01B 32/18* (2017.08); *C01B 32/194* (2017.08); *C01B 32/21* (2017.08); *C01B 32/28* (2017.08); *C01B 32/354* (2017.08); *C01B 2202/26* (2013.01)

(58) Field of Classification Search
    CPC ... C01B 32/354; C01B 2202/26; C01B 32/05; C01B 32/00; B82Y 40/00; B82Y 30/00
    See application file for complete search history.

(56) References Cited

U.S. PATENT DOCUMENTS

| | | | | |
|---|---|---|---|---|
| 7,122,710 | B2* | 10/2006 | Margrave | ................. C01B 32/15 570/129 |
| 2005/0087726 | A1 | 4/2005 | Anazawa et al. | |
| 2005/0158549 | A1 | 7/2005 | Khabashesku et al. | |
| 2006/0171874 | A1* | 8/2006 | Khabashesku | ......... B82Y 30/00 423/445 B |
| 2008/0049380 | A1 | 2/2008 | Miyahara et al. | |
| 2009/0088582 | A1* | 4/2009 | Inagaki | .................. B82Y 40/00 556/143 |

FOREIGN PATENT DOCUMENTS

| | | |
|---|---|---|
| JP | 60-191011 | 9/1985 |
| JP | H 09-500572 A | 1/1997 |
| JP | 2005-154887 A | 6/2005 |
| JP | 2006-240938 A | 9/2006 |
| JP | 2008-044820 A | 2/2008 |
| JP | 2011-136874 A | 7/2011 |
| WO | WO 95/01838 A1 | 1/1995 |
| WO | WO 97/12757 A1 | 4/1997 |
| WO | WO 2012/098345 A2 | 7/2012 |
| WO | WO 2013/162470 A1 | 10/2013 |

OTHER PUBLICATIONS

Stevens, et al., Sidewall Amino-Functionalization of Single-Walled Carbon Nanotubes through Fluorination and Subsequent Reaction with Terminal Diamines, Nano Letters 2003; 3(3): 331-336 (Year: 2003).*
Office Action received in Korean Application No. 10-2017-7033279, dated Jan. 23, 2019.
Extended European Search Report received in European Patent Application No. 16783260.9, dated Apr. 3, 2018.
Stevens et al., "Sidewall amino-functionalization of single-walled carbon nanotubes through fluorination and subsequent reactions with terminal diamines," Nano Lett, vol. 3, No. 3, Jan. 28, 2003, pp. 331-336.
Tasis et al., "Chemistry of Carbon Nanotubes," Chem Rev., vol. 106, No. 3, Feb. 23, 2006, pp. 1105-1136.
Yu et al., "Cross-Linking of Multi-Walled Nanotubes with Polyethylene Glycol," Polym Plast Tech Eng., vol. 50. No. 3, Jan. 18, 2011, pp. 328-331.
Office Action received in Russian Patent Application No. 2017135212, dated Jun. 29, 2018.
Search Report received in Russian Patent Application No. 2017135212, dated Jun. 29, 2018.
Orlov V.Yu et al., Production and use of technical carbon for rubbers, Yaroslavl, Alexander Rutman, 2002, p. 19.
International Search Report mailed by Japan Patent Office dated Jul. 5, 2016 in the corresponding PCT Application No. PCT/JP2016/062716.
Office Action received in CN 2019082901619800, dated Sep. 2019.
Bushimata, Kohei, et al. "Structural and electrochemical characterization of ethylenediaminated single-walled carbon nanotubes prepared from fluorinated SWCNTs." *The Journal of Physical Chemistry C* 118.27 (2014): 14948-14956.
Office Action received in JP 2016-085695 dated Dec. 2, 2019.
Office Action issued in CN application No. 201680023243.4, dated Apr. 24, 2020.
Stevens, Joel L., et al., "Sidewall Amino-Functionalization of Single-Walled Carbon Nanotubes through Fluorination and Subsequent Reactions with Terminal Diamines", «Nano Letters)), vol. 3, No. 3. pp. 331-336, Jan. 28, 2003.
Office Action issued in CN application No. 201680023243.4, dated Oct. 16, 2020.
Liu Yurong, "Synthesis and Application of Mesoporous Carbon Materials", National Defense Industry Press, Jun. 2012, p. 93.
Office Action issued in CN application No. 201680023243.4, dated Apr. 12, 2021.

* cited by examiner

Nu, Nu' : Nucleophilic group
R: Body part of nucleophilic compound

CROSS-LINKED STRUCTURE OF CARBON MATERIAL AND METHOD FOR PRODUCING SAME

INCORPORATION BY REFERENCE TO ANY PRIORITY APPLICATIONS

This application is the U.S. National Phase of International Application No. PCT/JP2016/062716, filed Apr. 22, 2016, designating the U.S. and claiming priority to Japanese Application No. 2015-087641, filed Apr. 22, 2015. Any and all applications for which a foreign or domestic priority claim is identified here or in the Application Data Sheet as filed with the present application are hereby incorporated by reference under 37 CFR 1.57.

TECHNICAL FIELD

The present invention relates to a cross-linked structure of a carbon material and a method for producing the same, and more particularly to a cross-linked structure of carbon material, the mechanical strength of which is improved by introducing a cross-linked structure into carbon materials such as carbon nanotubes, and a method for producing the same.

BACKGROUND

Carbon nanotubes (CNTs) are hollow cylindrical carbon materials having a diameter of several nm to several tens of nm, composed only of sp2 bonded carbon atoms. The existence of single wall carbon nanotubes (SWCNTs) and multi wall carbon nanotubes (MWCNTs) has been confirmed.

Theoretical calculation shows that carbon nanotubes have maximum tensile strength and Young's modulus among substances ever found. Carbon nanotubes have extremely high elastic force being based on lightweight such as about half of that of aluminum, and are expected to be applied to various structure materials because of excellent mechanical strength and lightweight properties thereof.

When carbon nanotubes are applied to macroscale structure materials, only one carbon nanotube cannot be applied and there is a need to use numerous carbon nanotubes in combination. One example of such material is a carbon nanotube fiber obtained by spinning carbon nanotubes. Regarding this carbon nanotube fiber, the respective carbon nanotubes are bonded to each other by Van der Waals force that is weak compared to an sp2 bond. Therefore, when pulling the carbon nanotube, slide through between the carbon nanotubes arises to cause a problem that the tensile strength of the carbon nanotube fiber is by far lower than the mechanical strength of the carbon nanotube itself, thus failing to sufficiently make use of properties possessed by the carbon nanotube.

A method for improving the mechanical strength of the carbon nanotube fiber includes, for example, those disclosed in Patent Document 1 mentioned below. The patent document mentions that fine particles are supported on a surface of a carbon nanotube to be drawn when spinning a carbon nanotube fiber, and a frictional force between carbon nanotubes is increased by unevenness formed by the fine particles, thereby suppressing slide through between carbon nanotube, thus making it possible to improve the tensile strength.

However, the tensile strength in the above method is approximately 1.3 times higher than that of a carbon nanotube fiber supporting no fine particles. Therefore, to sufficiently make use of properties possessed by the carbon nanotube, carbon materials with further improved mechanical strength such as tensile strength are required.

PRIOR ART DOCUMENT

Patent Document

Patent Document 1: JP 2011-136874 A

SUMMARY

The present invention has been made in light of aforementioned problems, and an object thereof is to provide a cross-linked structure of a carbon material, which is excellent in mechanical strength such as tensile strength, and a method for producing the same.

The present invention which can solve the foregoing problems provides a cross-linked structure of a carbon material, in which carbon materials are cross-linked with each other, wherein the carbon materials are cross-linked with each other through a linking group derived from a nucleophilic compound having two or more nucleophilic groups in the molecule.

With the above configuration, carbon materials are cross-linked with each other to form a cross-linked structure and, moreover, the linkage is performed through a linking group derived from a nucleophilic compound having two or more nucleophilic groups in the molecule. Therefore, it is possible to extremely improve the mechanical strength such as tensile strength, compared to a conventional carbon nanotube fiber.

The "nucleophilic compound" refers to chemical specifies which react with carbon atoms with low electron density to form a bond, and means a compound capable of forming a cross-linked structure of carbon materials. The "nucleophilic group" means a substituent which reacts with carbon atoms with low electron density to form a bond, and performs a nucleophilic substitution reaction.

In the above configuration, the linking group is composed of the nucleophilic compound in a state where halogen in a carbon-halogen bond existing on the surface of the carbon material, at least a surface of which is halogenated, is eliminated by a nucleophilic substitution reaction and substituted with the nucleophilic group, thereby introducing into the nucleophilic compound.

In the above configuration, it is preferred that the nucleophilic compound is at least one compound selected from the group consisting of chain aliphatic polyamine, cycloaliphatic polyamine, aliaromatic amine, aromatic amine, Grignard reagent, alkyllithium, metal alkoxide, polyhydric alcohol, dithiol, and organic peroxide.

In the above configuration, it is preferred that the carbon material is at least one selected from the group consisting of activated carbon, carbon nanohorn, carbon nanocoil, graphite, carbon black, diamond-like carbon, carbon fiber, graphene, amorphous carbon, fullerene, carbon nanotube, and diamond.

The present invention which can solve the foregoing problems provides a method for producing cross-linked structure of a carbon material, in which carbon materials are cross-linked with each other, the method comprising the steps of bringing the carbon material into contact with a treatment gas containing 0.01 to 100 vol % of a halogen atom-containing gas for a treatment time in a range of 1 second to 24 hours at a treatment temperature in a range of 0° C. to 600° C., thereby subjecting a surface of the carbon material to a halogenation treatment; and bringing a nucleophilic compound having two or more nucleophilic groups in the molecule into contact with the carbon material for treatment time in a range of 1 second to 24 hours, thereby subjecting the carbon material to a cross-linking treatment, wherein the halogenation treatment and the cross-linking treatment are performed simultaneously, performed continuously in an arbitrary order, or performed by adding during any treatment.

In the above configuration, in the step of a halogenation treatment, by bringing the carbon material into contact with a treatment gas containing a halogen atom-containing gas, halogen groups are introduced into a surface of the carbon material, thus making it possible to form the foothold of a reaction. In the step of a cross-linking treatment, by bringing a nucleophilic compound into contact with the carbon material, into which halogen groups are introduced, nucleophilic groups in the nucleophilic compound react with carbon atoms serving as the foothold of the reaction, thus making it possible to eliminate halogen atoms. Other nucleophilic groups in the nucleophilic compound similarly performs the nucleophilic substitution reaction in the other carbon material, whereby, carbon materials are linked with each other through a linking group, thus making it possible to form a cross-linked structure. As a result, with the above configuration, it is possible to produce a cross-linked structure of a carbon material, in which the mechanical strength such as tensile strength is extremely improved, compared to a conventional carbon nanotube fiber.

In the above configuration, it is preferred that the nucleophilic compound is at least one compound selected from the group consisting of chain aliphatic polyamine, cycloaliphatic polyamine, aliaromatic amine, aromatic amine, Grignard reagent, alkyllithium, metal alkoxide, polyhydric alcohol, dithiol, and organic peroxide.

In the above configuration, it is preferred that the carbon material is at least one selected from the group consisting of activated carbon, carbon nanohorn, carbon nanocoil, graphite, carbon black, diamond-like carbon, carbon fiber, graphene, amorphous carbon, fullerene, carbon nanotube, and diamond.

According to a cross-linked structure of a carbon material of the present invention, since carbon materials are linked to each other through a linking group derived from a nucleophilic compound having two or more nucleophilic groups in the molecule to form a cross-linked structure, it is possible to extremely improve the mechanical strength such as tensile strength, compared to a conventional carbon nanotube fiber.

According to a method for producing cross-linked structure of a carbon material of the present invention, halogen groups are introduced into a surface of a carbon material by a halogenation treatment and halogen groups are eliminated by a cross-linking treatment, thereby introducing linking groups derived from a nucleophilic compound, thus making it possible to cross-like carbon materials with each other. Namely, the production method of the present invention can produce a cross-linked structure of a carbon material, which is excellent in mechanical strength such as tensile strength, compared to a conventional carbon nanotube fiber.

Figure 1:
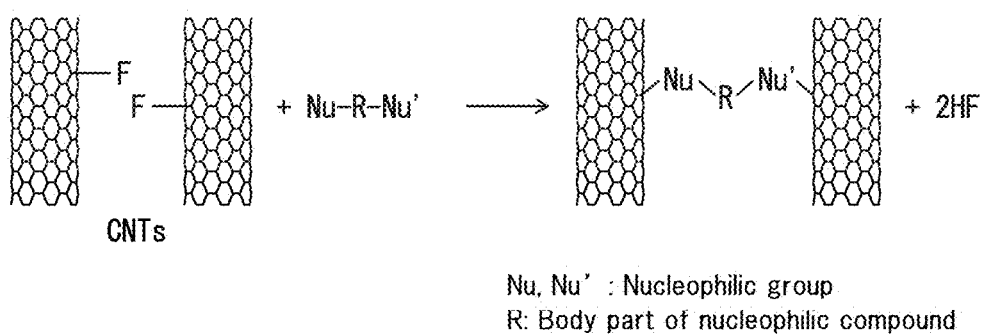
FIG. 1 is an explanatory view for explaining a method for producing a cross-linked structure of a carbon material according to one embodiment of the present invention.

DETAILED DESCRIPTION (Cross-Linked Structure of Carbon Material)

A description will be made of a cross-linked structure of a carbon material (hereinafter may be referred to as the "cross-linked structure") according to one embodiment of the present invention.

A cross-linked structure of the present embodiment has a structure in which carbon materials are cross-linked with each other by linking through a linking group derived from a nucleophilic compound having two or more nucleophilic groups in the molecule.

There is no particular limitation on the carbon material as long as it is provided with a carbon skeleton composed of carbon atoms, and the carbon material is preferably a carbon material, diamond, or the like, which is provided with a cyclic skeleton in each of which carbon atoms are bonded to form a ring. The carbon material provided with a cyclic skeleton of carbon atoms includes, for example, activated carbon, carbon nanocoil, graphite, carbon black, diamond-like carbon, carbon fiber, graphene, amorphous carbon, fullerene, carbon nanotube, and the like. Examples of the carbon nanotube include single wall carbon nanotube (SWNT) with a structure composed of one tube (graphene sheet) of a hexagonal network, multi wall carbon nanotube (MWNT) composed of a multilayered graphene sheet, fullerene tube, buckytube, and graphite fibril. It is also possible to use, as the carbon material according to the present invention, an analogue having a basic structure of such carbon material. These carbon materials can be used alone, or two or more carbon materials can be used in combination. The "carbon skeleton" means a skeleton which does not contain hydrogen atoms and substituents, and is entirely composed of carbon atoms.

The nucleophilic compound is a compound which contains two or more nucleophilic groups in the molecule, and enables formation of a cross-linked structure between carbon materials. The nucleophilic group means a substituent which reacts with carbon atoms with low electron density to form a bond, and performs a nucleophilic substitution reaction, and specific examples thereof include —$NH_2$ group, —MgX (X represents halogen), —Li, —O—, —OH, —SH, —O—O—, or derivatives thereof.

The number of the nucleophilic groups is at least two or more in the molecule of the nucleophilic compound. It is not preferred that it becomes difficult to cross-link with the other carbon material when one nucleophilic group exists in the molecule. The nucleophilic groups existing in the molecule may be the same or different.

The content of the nucleophilic group is preferably 0.01% by mass to 100% by mass relative to the total mass of the nucleophilic compound. It is possible to sufficiently introduce a cross-linked structure into the carbon material by setting the content of the nucleophilic group at 0.01% by mass or more.

Specifically, the nucleophilic compound is at least one compound selected from the group consisting of chain aliphatic polyamine, cycloaliphatic polyamine, aliaromatic amine, aromatic amine, Grignard reagent, alkyllithium, metal alkoxide, polyhydric alcohol, dithiol, and organic peroxide.

The chain aliphatic polyamine includes, for example, ethylenediamine (EDA), putrescine, cadaverine, hexamethylenediamine, diethylenetriamine, triethylenetetramine, tetraethylenepentamine, dipropylenediamine, dimethylaminopropylamine, and the like.

The cycloaliphatic polyamine includes, for example, N-aminoethylpiperazine, bis(4-amino-3-methylcyclohexyl)-methane, mencenediamine, isophoronediamine, 4,4'-diaminodicyclohexylmethane, 1,3-bisaminomethylcyclohexane (1,3-BAC), and the like.

The aliaromatic amine includes, for example, meta-xylenediamine (MXDA), xylylenediamine, xylylenediamine trimer, xylylenediamine derivatives, and the like.

The aromatic amine includes, for example, meta-phenylenediamine, diaminodiphenylmethane, diaminodiphenyl sulfone, and the like.

The Grignard reagent includes, for example, pentamethylenebis(magnesium bromide), and the like.

The alkyllithium includes, for example, methyllithium, ethyllithium, n-butyllithium, and the like.

The metal alkoxide includes, for example, silicon alkoxide, aluminum alkoxide, zirconium alkoxide, titanium alkoxide, calcium alkoxide, yttrium alkoxide, tantalum alkoxide, and the like.

The polyhydric alcohol includes, for example, ethylene glycol, propylene glycol, glycerin, and the like.

The dithiol includes, for example, 1,2-ethanedithiol, and the like.

The organic peroxide includes, for example, benzoyl peroxide, methyl ethyl ketone peroxide, dimethyldioxirane, and the like.

As used herein, "derived from a nucleophilic compound having two or more nucleophilic groups" means that nucleophilic groups contained in the nucleophilic compound mentioned above are formed by performing a nucleophilic substitution reaction to a carbon-halogen bond introduced by a surface treatment due to halogenation of the carbon material, and "linking group derived from the nucleophilic compound having two or more nucleophilic groups" means a linking site between carbon materials formed by the nucleophilic substitution reaction.

The cross-linked structure of the present embodiment has a cross-linked structure in which carbon materials are linked with each other through the linking group. Therefore, the cross-linked structure is excellent in mechanical strength such as tensile strength. As used herein, "tensile strength" is a breaking strength, and means a maximum tensile strength at a breaking point of the carbon material measured in a tensile test.

The cross-linked structure of the present embodiment can be appropriately used, for example, as composite materials, hydrogen storage materials, gas storage materials, electronic materials (luminescent materials, optical materials, electrode materials, electromagnetic wave absorption materials, semiconductor materials, damping materials, vibrating materials, abrasive materials, etc.), electronic materials (probe, sensor, lighting, transistor, capacitor, condenser, conductor, surge absorber, etc.), pharmaceutical materials, biomaterials, catalysts, lubricants, and chemical products.

(Method for Producing Cross-Linked Structure of Carbon Material)

A method for producing a cross-linked structure of the present embodiment will be described below with reference to FIG. 1. FIG. 1 is an explanatory view for explaining a method for producing a cross-linked structure.

As shown in FIG. 1, the method for producing a cross-linked structure of the present embodiment includes the step of subjecting a surface of a carbon material to a halogenation treatment, and the step of subjecting the carbon material to a cross-linking treatment.

The step of a halogenation treatment is the step of bringing at least a treatment gas containing a halogen atom-containing gas into contact with a carbon material, thereby subjecting the surface to a halogenation treatment in a gas phase. In the case of the fluorination treatment, as shown in FIG. 1, fluorine groups due to a carbon-fluorine bond are introduced into a surface of carbon materials by the step. Therefore, unlike an oxidation treatment in which oxygen-containing functional groups such as hydroxyl groups, carbonyl groups, or carboxyl groups are imparted to the edge portion of a carbon hexagonal net surface, it is possible to halogenate the surface without causing structural defects, for example, the carbon material is damaged or decomposed.

It is possible to use, as the treatment gas, a treatment gas containing 0.01 to 100 vol %, preferably 0.1 to 80 vol %, and more preferably 1 to 50 vol % of a halogen atom-containing gas, relative to the whole volume. It is possible to prevent insufficient halogenation of the surface of the carbon material by setting the concentration of the halogen atom-containing gas at 0.01 vol % or more.

The halogen atom-containing gas means a gas containing halogen atoms, and is not particularly limited as long as it contains halogen atoms in the present embodiment. The halogen atoms mean fluorine atoms, chlorine atoms, bromine atoms, iodine atoms, and the like. The halogen atom-containing gas includes, for example, fluorine ($F_2$), chlorine ($Cl_2$), bromine ($Br_2$), iodine ($I_2$), hydrogen fluoride (HF), hydrogen chloride (HCl), hydrogen bromide (HBr), hydrogen iodide (HI), chlorine trifluoride ($ClF_3$), sulfur tetrafluoride ($SF_4$), boron trifluoride ($BF_3$), nitrogen trifluoride ($NF_3$), carbonyl fluoride ($COF_2$), and the like. These halogen atom-containing gases may be used alone, or two or more halogen atom-containing gases may be used as a mixture.

An inert gas may be contained in the treatment gas. There is no particular limitation on the inert gas, but it is not preferred to use an inert gas which reacts with the halogen atom-containing gas, thereby exerting an adverse influence on a halogenation treatment of the carbon material, an inert gas which reacts with the carbon material, thereby exerting an adverse influence, and an inert gas containing impurities which exert the adverse influence. Specifically, for example, nitrogen, argon, helium, neon, krypton, xenon, and the like are exemplified. These inert gases may be used alone, or two or more inert gases may be used as a mixture. There is no particular limitation on purity of the inert gas, and the content of impurities which exert the adverse influence is preferably 100 ppm or less, more preferably 10 ppm or less, and particularly preferably 1 ppm or less.

It is preferred that the treatment gas does not contain a gas containing oxygen atoms. The reason is that inclusion of the gas containing oxygen atoms leads to introduction of hydroxyl groups or carboxyl groups into a surface of the carbon material, thus exerting large damage on the carbon material. The gas containing oxygen atoms means an oxygen gas or a nitric acid gas.

When the halogenation treatment is performed, the treatment temperature is in a range of 0° C. to 600° C., preferably 0° C. to 150° C., more preferably 10° C. to 100° C., and still more preferably 20° C. to 50° C. By setting the treatment temperature at 0° C. or higher, it is possible to accelerate the halogenation treatment. Meanwhile, by setting the treatment temperature at 600° C. or lower, it is possible to suppress defects to a carbon skeleton generated with the introduction of halogen groups into a surface of the carbon material from excessively increasing, thus preventing excessive breakage of the carbon skeleton and reduction of the mechanical strength of the carbon material. It is also possible to prevent the carbon material from causing thermal deformation, thus suppressing a decrease of the yield.

The treatment time (reaction time) of the halogenation treatment is in a range of 1 second to 24 hours, preferably 1 minute to 12 hours, and more preferably 1 minute to 9 hours. By setting the treatment time at 1 second or more, it is possible to sufficiently halogenate a surface of a carbon material. Meanwhile, by setting the treatment time at 24 hours or less, it is possible to prevent degradation of the producibility due to prolongation of the production time.

There is no particular limitation on pressure conditions when the halogenation treatment is performed, and the halogenation treatment can be performed under normal pressure, increased pressure, or reduced pressure. From the viewpoint of economy and safety, the halogenation treatment is preferably performed under normal pressure. There is no particular limitation on a reaction vessel for a halogenation treatment, and it is possible to employ, as the reaction vessel, conventionally known one such as a fixed bed or a fluidized bed.

There is no particular limitation on a method for bringing a treatment gas into contact with a carbon material, and it is possible to contact under a flow of the treatment gas.

The step of the cross-linking treatment is the step of bringing a nucleophilic compound into contact with a carbon material, into which halogen groups are introduced, thereby to form a cross-linked structure in which carbon materials are linked with each other through a linking group (see FIG. 1).

It is possible to use, as the nucleophilic compound, a gaseous, liquid, or solid nucleophilic compound without particular limitation. It is also possible to use a liquid or solid nucleophilic compound after mixing with a solvent. Plural nucleophilic compounds may be used in combination.

When the nucleophilic compound is a gaseous nucleophilic compound, the cross-linking treatment can be performed by bringing into contact with the carbon material under a flow of the gaseous nucleophilic compound, or under an atmosphere of the gaseous nucleophilic compound in a vessel in a sealed state. When the nucleophilic compound is a liquid or solid nucleophilic compound, and is vaporized by heating in a range of a treatment temperature mentioned below, the cross-linking treatment can be performed under a flow of the gaseous nucleophilic compound, or under an atmosphere of the gaseous nucleophilic compound in a vessel in a sealed state. When the nucleophilic compound is a liquid nucleophilic compound, or when using a treatment liquid prepared by mixing a liquid or solid nucleophilic compound with a solvent, the cross-linking treatment can be performed by immersing the carbon material in a liquid nucleophilic compound or treatment liquid.

When a liquid or solid nucleophilic compound is mixed with a solvent, there is no particular limitation on a usable solvent. However, it is not preferred to use a solvent which reacts with a nucleophilic group, thereby exerting an adverse influence on a cross-linking treatment to the carbon material, a solvent which reacts with the carbon materials, thereby exerting an adverse influence, and a solvent containing impurities which exert the adverse influence. Specific examples of the usable solvent include water, methanol, ethanol, 1-propanol, 2-propanol, 1-butanol, toluene, acetone, tetrahydrofuran, diethylether, acetonitrile, N,N-dimethylformamide, dimethyl sulfoxide, and the like. These solvents can be used alone, or two or more solvents can be used as a mixture. There is no particular limitation on purity of the solvent, and the content of impurities, which exert an adverse influence, is preferably 100 ppm or less, more preferably 10 ppm or less, and particularly preferably 1 ppm or less.

When a liquid or solid nucleophilic compound is mixed with the solvent, the content of the nucleophilic compound is not particularly limited and is appropriately set according to types of the nucleophilic compound and solvent. The upper limit of the content of the nucleophilic compound is preferably saturated solubility of the nucleophilic compound in the solvent or less.

A reagent for removing hydrogen halide such as HF by-produced during a nucleophilic substitution reaction (hydrogen halide remover) may be added in advance to the solvent to be mixed with the liquid or solid nucleophilic compound. Alternatively, the reagent may be added to a treatment liquid prepared by mixing a liquid or solid nucleophilic compound with a solvent. After bringing a carbon material subjected to a halogenation treatment into contact with a treatment liquid prepared by mixing a liquid or solid nucleophilic compound with a solvent, the reagent may be added to the treatment liquid. By removing by-produced HF a nucleophilic substitution reaction is accelerated, thus making it possible to further increase cross-linking degree of carbon materials. As a result, it is possible to further improve the mechanical strength of the cross-linked structure. The reagent is not particularly limited and includes, for example, a base such as pyridine, triethylamine, or melamine.

When the reagent (hydrogen halide remover) is added, the amount of the reagent to be added is not particularly limited. Usually, the amount is preferably an equivalent of hydrogen halide, which can be by-produced by a cross-linking treatment, or more.

When a cross-linking treatment is performed using a liquid nucleophilic compound as the nucleophilic compound, the treatment temperature is preferably in a range of 0° C. to 200° C., more preferably 0° C. to 100° C., and particularly preferably 0° C. to 80° C. By setting the treatment temperature at 0° C. or higher, it is possible to further accelerate the cross-linking treatment. Meanwhile, by setting the treatment temperature at 200° C. or lower, it is possible to prevent the carbon material from causing thermal deformation, thus suppressing decrease of the yield.

When a cross-linking treatment is performed using a gaseous nucleophilic compound as the nucleophilic compound, the treatment temperature is preferably in a range of 0° C. to 200° C., more preferably 0° C. to 100° C., and particularly preferably 0° C. to 80° C. By setting the treatment temperature at 0° C. or higher, it is possible to further accelerate the cross-linking treatment to the carbon material. Meanwhile, by setting the treatment temperature at 200° C. or lower, it is possible to prevent the carbon material from causing thermal deformation, thus suppressing decrease of the yield.

When a cross-linking treatment is performed using a liquid nucleophilic compound or the treatment liquid, the treatment time (reaction time) of the cross-linking treatment is in a range of 1 second to 24 hours, preferably 30 seconds to 6 hours, and more preferably 1 minute to 4 hours. By setting the treatment time at 1 second or more, it is possible to further accelerate the cross-linking treatment to the carbon material. Meanwhile, by setting the treatment time at 24 hours or less, it is possible to prevent degradation of the producibility due to prolongation of the production time.

When using a gaseous nucleophilic compound, the treatment time (reaction time) of the cross-linking treatment is in a range of 1 second to 24 hours, preferably 1 minute to 12 hours, and more preferably 1 minute to 9 hours. By setting the treatment time at 1 second or more, it is possible to further accelerate the cross-linking treatment to the carbon material. Meanwhile, by setting the treatment time at 24 hours or less, it is possible to prevent degradation of the producibility due to prolongation of the production time.

When a cross-linking treatment is performed using a gaseous nucleophilic compound, there is no particular limitation on pressure conditions, and the cross-linking treatment is performed under normal pressure, increased pressure, or reduced pressure. From the viewpoint of economy and safety, the cross-linking treatment is preferably performed under normal pressure. There is no particular limitation on a reaction vessel for performing a cross-linking treatment, and it is possible to use conventionally known one such as a fixed bed or a fluidized bed.

When using a gaseous nucleophilic compound, there is no particular limitation on the concentration, and it is possible to appropriately set the concentration, if necessary.

An inert gas may be contained in the gaseous nucleophilic compound. There is no particular limitation on the inert gas, but it is not preferred to use an inert gas which reacts with the gaseous nucleophilic compound, thereby exerting an adverse influence on a cross-linking treatment of the carbon material, an inert gas which reacts with the carbon material, thereby exerting an adverse influence, and an inert gas containing impurities which exert the adverse influence. Specifically, for example, nitrogen, argon, helium, neon, krypton, xenon, and the like are exemplified. These inert gases may be used alone, or two or more inert gases may be used as a mixture. There is no particular limitation on purity of the inert gas, and the content of impurities which exert the adverse influence is preferably 100 ppm or less, more preferably 10 ppm or less, and particularly preferably 1 ppm or less.

The cross-linking treatment may be continuously performed in a reaction vessel without taking out the carbon material after the halogenation treatment from the reaction vessel. In this case, the cross-linking treatment can be performed by evacuating the treatment gas for the halogenation treatment, which remains in the reaction vessel, and then introducing a gaseous nucleophilic compound into the reaction vessel. Alternatively, the gaseous nucleophilic compound may be introduced into the reaction vessel without evacuating the treatment gas. Whereby, it is possible to omit a complicated operation such as taking out of the carbon material after the halogenation treatment from the reaction vessel, thus shortening the treatment time. It is also possible to subject the carbon material after the halogenation treatment to the cross-linking treatment without being influenced by moisture and oxygen in the atmosphere.

After the cross-linking treatment, the cross-linked structure thus obtained may be subjected to the cleaning and drying step. Whereby, the nucleophilic compound remaining in the carbon material can be removed. There is no particular limitation on a cleaner to be used in the cleaning step and the cleaner includes, for example, ethanol, water, 2-propanol, toluene, acetone, and the like. There is no particular limitation on cleaning conditions. Usually, cleaning is performed at the cleaning temperature in a range of 0° C. to 100° C. for the cleaning time in a range of 1 minute to 60 minutes. There is no particular limitation on the drying method in the drying step and the drying method includes, for example, natural drying, hot-air drying, and the like. There is no particular limitation on drying conditions. Usually, drying is performed at the drying temperature in a range of 0° C. to 100° C. for the drying time in a range of 1 hour to 24 hours.

It is also possible to simultaneously perform the halogenation treatment and the cross-linking treatment. Specifically, a cross-linked structure of a carbon material is produced by introducing a mixed gas of a treatment gas for the halogenation treatment and a gaseous nucleophilic compound into a reaction vessel containing a carbon material.

An inert gas may be contained in the mixed gas. There is no particular limitation on the inert gas, but it is not preferred to use an inert gas which reacts with treatment gas for the halogenation treatment and the gaseous nucleophilic compound, thereby exerting an adverse influence on a cross-linking treatment of the carbon material, an inert gas which reacts with the carbon material, thereby exerting an adverse influence, and an inert gas containing impurities which exert the adverse influence. Specifically, for example, nitrogen, argon, helium, neon, krypton, xenon, and the like are exemplified. These inert gases may be used alone, or two or more inert gases may be used as a mixture. There is no particular limitation on purity of the inert gas, and the content of impurities which exert the adverse influence is preferably 100 ppm or less, more preferably 10 ppm or less, and particularly preferably 1 ppm or less.

When the halogenation treatment and the cross-linking treatment are simultaneously performed using the mixed gas, the treatment temperature is preferably in a range of 0° C. to 200° C., more preferably 0° C. to 100° C., and particularly preferably 0° C. to 80° C. By setting the treatment temperature at 0° C. or higher, it is possible to further accelerate the halogenation treatment and the cross-linking treatment carbon materials to the carbon material. Meanwhile, by setting the treatment temperature at 200° C. or lower, it is possible to prevent the carbon material from causing thermal deformation, thus suppressing a decrease of the yield.

When the halogenation treatment and the cross-linking treatment are simultaneously performed using the mixed gas, the treatment time (reaction time) is in a range of 1 second to 24 hours, preferably 1 minute to 12 hours, and more preferably 1 minute to 9 hours. By setting the treatment time at 1 second or more, it is possible to further accelerate the cross-linking treatment to the carbon material. Meanwhile, by setting the treatment time at 24 hours or less, it is possible to prevent degradation of producibility due to prolongation of the production time.

In the method for producing a cross-linked structure of the present embodiment, the halogenation treatment may be performed after performing the cross-linking treatment. In this case, when the gaseous nucleophilic compound is first brought into contact with the carbon material, it goes into a state where the gaseous nucleophilic compound remains on a surface of the carbon material. Subsequently, when a treatment gas containing a halogen atom-containing gas is brought into contact with the carbon material in the halogenation treatment, introduction of halogen groups occurs on the surface of the carbon material and, immediately thereafter, nucleophilic groups of the gaseous nucleophilic compound, which remain on the carbon material, cause a nucleophilic substitution reaction with a carbon-halogen bond to form a linking group, thus introducing a cross-linked structure. Whereby, a cross-linked structure of carbon material can be produced. Each of treatment conditions of the halogenation treatment and the cross-linking treatment will be equivalent to each of conditions mentioned above.

In the method for producing a cross-linked structure of the present embodiment, the cross-linking treatment may be performed by introducing a gaseous nucleophilic compound in the step of the halogenation treatment, or the halogenation treatment may be performed by introducing a treatment gas for the halogenation treatment in the step of the cross-linking treatment. In these cases, each of treatment conditions of the halogenation treatment and the cross-linking treatment will also be equivalent to each of conditions mentioned above.

In the method for producing a cross-linked structure of the present embodiment, at least one of the halogenation treatment and the cross-linking treatment may be performed plural times. By performing the halogenation treatment plural times, halogen groups can be further introduced into a surface of the carbon material. By performing the cross-linking treatment plural times, cross-linking degree of carbon materials can be further enhanced. As a result, it is possible to further improve the mechanical strength of the cross-linked structure.

As mentioned above, the production method of the present embodiment can produce a cross-linked structure of a carbon material, in which carbon materials are cross-linked by linking with each other through a linking group derived from a nucleophilic compound having two or more nucleophilic groups, in a simple and easy way. According to the production method of the present embodiment, it becomes possible to form a cross-linked structure between the carbon nanotube fibers in a state of keeping the fiber shape to a carbon nanotube fiber converted into a continuous fiber by growing the molecular arrangement of a carbon nanotube as a carbon material. As a result, it is also possible to produce a carbon nanotube fiber which is excellent in mechanical strength such as tensile strength. Use of a gaseous nucleophilic compound during a cross-linking treatment enables formation of a cross-linked structure which keeps the characteristic structure even to the carbon material such as a vertically oriented carbon nanotube.

EXAMPLES

Example 1

A carbon nanotube fiber (manufactured by Planet, Inc., cut into a diameter of 30 μm and a length of 100 mm) was introduced into a polytetrafluoroethylene (PTFE) vessel (volume of 5 mL) and this vessel was disposed in an electrolytically polished chamber made of SUS316L (volume of 30 mL). The atmosphere inside the chamber was replaced with nitrogen by vacuum substitution and the temperature was raised to 25° C. at 4° C./min under a nitrogen gas flow (20 mL/min), followed by an isothermal treatment for 1 hour.

After replacing with a treatment gas, prepared by diluting a fluorine gas to 20 vol % with nitrogen, by vacuum substitution, a fluorination treatment was performed at 25° C. for 4 hours by allowing the gas to flow through the chamber at a flow rate of 25 mL/min. The atmosphere inside the chamber was replaced with nitrogen by vacuum substitution and, after a fluorination treatment at room temperature under a nitrogen gas flow (20 mL/min), a carbon nanotube fiber was taken out.

On a slide glass, 1 mL of ethylenediamine (EDA) was dropped and the carbon nanotube fiber after subjecting to the fluorination treatment was immersed in the droplet at a treatment temperature of 25° C. for 5 minutes, thereby performing a treatment for introduction of a cross-linked structure. The carbon nanotube fiber was pulled up from the droplet, cleaned with ethanol, and then dried in the atmosphere. The drying temperature was set at 25° C. and the drying time was set at 2 hours. Thus, a cross-linked structure of a carbon nanotube fiber according to the present example was produced.

Example 2

In Example 2, ethylenediamine (EDA) containing fives droplets of pyridine as a hydrogen halide remover added dropwise in advance was used. In the same manner as in Example 1, except those mentioned above, a cross-linked structure of a carbon nanotube fiber was fabricated.

Example 3

In Example 3, the treatment temperature during the fluorination treatment was changed to 50° C. In the same manner as in Example 1, except those mentioned above, a cross-linked structure of a carbon nanotube fiber was fabricated.

Example 4

In Example 4, the nucleophilic compound used in the cross-linking treatment was changed to 1,3-bisaminomethylcyclohexane (1,3-BAC). In the same manner as in Example 1, except those mentioned above, a cross-linked structure of a carbon nanotube fiber was fabricated.

Example 5

In Example 5, the treatment temperature during the fluorination treatment was changed to 50° C. In the same manner as in Example 4, except those mentioned above, a cross-linked structure of a carbon nanotube fiber was fabricated.

Example 6

In Example 6, the nucleophilic compound to be used in the cross-linking treatment was changed to meta-xylenediamine (MXDA). In the same manner as in Example 1, except those mentioned above, a cross-linked structure of a carbon nanotube fiber was fabricated.

Example 7

In Example 7, the treatment temperature during the fluorination treatment was changed to 50° C. In the same manner as in Example 6, except those mentioned above, a cross-linked structure of a carbon nanotube fiber was fabricated.

Example 8

In Example 8, the nucleophilic compound to be used in the cross-linking treatment, a mixture obtained by mixing ethylenediamine with 1,3-bisaminomethylcyclohexane in a mass ratio of 1:1. In the same manner as in Example 1, except those mentioned above, a cross-linked structure of a carbon nanotube fiber was fabricated.

Example 9

In Example 9, a mixture obtained by adding 0.5M pentamethylenebis(magnesium bromide) to a tetrahydrofuran solution was used as the nucleophilic compound to be used in the cross-linking treatment. In the same manner as in Example 1, except those mentioned above, a cross-linked structure of a carbon nanotube fiber was fabricated.

Example 10

In Example 10, the treatment temperature during the fluorination treatment was changed to 50° C. In the same manner as in Example 9, except those mentioned above, a cross-linked structure of a carbon nanotube fiber was fabricated.

Example 11

In Example 11, the treatment temperature during the cross-linking treatment was changed to 80° C. In the same manner as in Example 1, except those mentioned above, a cross-linked structure of a carbon nanotube fiber was fabricated.

Example 12

Into a glass beaker (volume of 100 mL), 1 g of ethylenediamine was introduced and this vessel was disposed in an electrolytically polished chamber made of SUS316L (volume of 600 mL). Subsequently, excess vapor and oxygen remaining in the chamber were purged by allowing a nitrogen gas to flow (60 mL/min) through the chamber for 15 minutes.

In the other chamber which is the same type as that of the above chamber, a fluorination treatment of a carbon nanotube fiber was performed in the same manner as in Example 1. After evacuating inside the other chamber to 1 Pa or less, an ethylenediamine gas was introduced from the chamber containing ethylenediamine mentioned above at 25° C. (treatment temperature). The other chamber was turned into a sealed state and the carbon nanotube fiber after subjecting to the fluorination treatment was brought into contact with an ethylenediamine gas for 4 hours, thereby subjecting to a cross-linking treatment. Whereby, a cross-linked structure of a carbon nanotube fiber according to the present Example 12 was fabricated.

Example 13

In Example 13, the treatment temperature during the cross-linking treatment was changed to 80° C. In the same manner as in Example 12, except those mentioned above, a cross-linked structure of a carbon nanotube fiber was fabricated.

Example 14

In Example 14, a carbon nanotube fiber was simultaneously subjected to a fluorination treatment and a cross-linking treatment. Namely, the same carbon nanotube fiber as in Example 1 was introduced into a PTFE vessel and this vessel was disposed in an electrolytically polished chamber made of SUS316L, and then inside the chamber was evacuated to 1 Pa or less. Then, a mixed gas of a fluorine gas and an ethylenediamine gas was introduced into the chamber at 25° C. and an untreated carbon nanotube fiber was brought into contact with the mixed gas for 4 hours to fabricate a cross-linked structure of a carbon nanotube fiber. A mixing ratio (volume ratio) of the mixed gas of the fluorine gas and the ethylenediamine gas was set at 1:1.

Example 15

In this Example 15, a nucleophilic compound was brought into contact with a carbon nanotube fiber (cross-linking treatment) and then brought into contact with a treatment gas for a fluorination treatment to fabricate the cross-linked structure of a carbon nanotube fiber. Namely, an ethylenediamine gas was introduced into a chamber containing an untreated carbon nanotube fiber in the same manner as in Example 12. Inside the chamber was evacuated and a treatment gas prepared by diluting a fluorine gas to 20 vol % with nitrogen was introduced at a flow rate of 25 mL/min, thereby subjecting to a fluorination treatment for 4 hours. After completion of the fluorination treatment, the treatment gas inside the chamber was evacuated and nitrogen was introduced at a flow rate of 20 mL/min, and then a carbon nanotube fiber after subjecting to the treatment was taken out at room temperature. Whereby, a cross-linked structure of a carbon nanotube fiber according to the present example was fabricated.

Example 16

In Example 16, the fluorination treatment and the cross-linking treatment mentioned in Example 12 were repeated twice, respectively. In the same manner as in Example 12, except those mentioned above, a cross-linked structure of a carbon nanotube fiber according to the present example was fabricated.

Example 17

In Example 17, the fluorination treatment and the cross-linking treatment mentioned in Example 12 were repeated four times, respectively. In the same manner as in Example 12, except those mentioned above, a cross-linked structure of a carbon nanotube fiber according to the present invention was fabricated.

Example 18

In Example 18, the fluorination treatment and the cross-linking treatment mentioned in Example 4 were repeated three times, respectively. In the same manner as in Example 4, except those mentioned above, a cross-linked structure of a carbon nanotube fiber according to the present Example was fabricated.

Example 19

In Example 19, two graphite blocks each measuring 10 mm×10 mm×5 mm in thickness (manufactured by Toyo Tanso Co., Ltd., IG11) were subjected to fluorination treatment under the same conditions as in Example 1. Then, two fluorinated graphite blocks were laid one upon another and subjected to a cross-linking treatment in a state of being pressed by a force of 0.006 MPa. The cross-linking treatment was performed in the same manner as in Example 12, except that the treatment temperature was changed to 80° C. Whereby, a cross-linked structure of graphite blocks according to the present example was fabricated. Observation of the cross-linked structure revealed that two graphite blocks are bonded to each other.

Example 20

In Example 20, two graphite blocks mentioned in Example 19 and a powder of a carbon nanotube (manufactured by Nanolab, Inc., trade name: Multiwall Carbon Nanotubes, Hollow Structure) were subjected to fluorination treatment under the same conditions as in Example 1. Then, two fluorinated graphite blocks were laid one upon another in a state where a fluorinated carbon nanotube powder is interposed between two fluorinated graphite blocks, followed by pressing by a force of 0.006 MPa and further a cross-linking treatment in this state. The cross-linking treatment was performed in the same manner as in Example 19. Whereby, a cross-linked structure of graphite blocks and a carbon nanotube powder according to the present example was fabricated. Observation of the cross-linked structure revealed that two graphite blocks are bonded to each other.

Comparative Example 1

In Comparative Example 1, a carbon nanotube fiber was subjected only to a cross-linking treatment without performing a fluorination treatment. In the same manner as in Example 1, except those mentioned above, a carbon nanotube fiber material was fabricated.

Comparative Example 2

In Comparative Example 2, a carbon nanotube fiber was subjected only to a cross-linking treatment without performing a fluorination treatment. In the same manner as in Example 12, except those mentioned above, a carbon nanotube fiber material was fabricated.

Comparative Example 3

In Comparative Example 3, the nucleophilic compound to be used in the cross-linking treatment was changed to 1,3-bisaminomethylcyclohexane. In the same manner as in Comparative Example 1, except those mentioned above, a carbon nanotube fiber material was fabricated.

Comparative Example 4

In Comparative Example 4, a mixture obtained by adding 0.5M pentamethylenebis(magnesium bromide) to a tetrahydrofuran solution was used as the nucleophilic compound to be used in the cross-linking treatment. In the same manner as in Comparative Example 1, except those mentioned above, a carbon nanotube fiber material was fabricated.

Comparative Example 5

In Comparative Example 5, the nucleophilic compound to be used in the cross-linking treatment was changed to tridecylamine containing only one nucleophilic substituent in the molecule. In the same manner as in Example 1, except those mentioned above, a carbon nanotube fiber material was fabricated.

Comparative Example 6

In Comparative Example 6, the nucleophilic compound to be used in the cross-linking treatment was changed to a mixture obtained by adding 1.0M pentylmagnesium chloride containing only one nucleophilic substituent in the molecule to a tetrahydrofuran solution. In the same manner as in Example 1, except those mentioned above, a carbon nanotube fiber material was fabricated.

Comparative Example 7

In Comparative Example 7, two graphite blocks mentioned in Example 19 were laid one upon another without performing a fluorination treatment and then a cross-linking treatment was performed in a state of being pressed by a force of 0.006 MPa. The cross-linking treatment was performed in the same manner as in Example 19. Observation of two graphite blocks laid one upon another after the cross-linking treatment revealed that both graphite blocks are not bonded to each other.

Comparative Example 8

In Comparative Example 8, two graphite blocks mentioned in Example 19 were subjected to a fluorination treatment under the same conditions as in Example 1. Then, two fluorinated graphite blocks were laid one upon another, followed by pressing by a force of 0.006 MPa. Thereafter, the cross-linking treatment was not performed. Observation of two fluorinated graphite blocks laid one upon another revealed that both fluorinated graphite blocks are not bonded to each other.

(Measurement of Tensile Strength)

Each cross-linked structure of a carbon nanotube fiber obtained in Examples 1 to 18 and Comparative Examples 1 to 6 was observed by a digital microscope (manufactured by KEYENCE CORPORATION, trade name; VHX-5000) and the diameter was measured at 20 points, and then a cross-sectional area was calculated using an average as the diameter.

Using a force gauge (manufactured by IMADA CO., LTD., trade name; ZTS-5N), a tensile test of each cross-linked structure of a carbon nanotube fiber was performed and the maximum breaking strength was measured. Furthermore, each tensile strength was calculated by dividing the maximum breaking strength by the above-mentioned cross-sectional area. The tensile strength of the carbon nanotube fiber, which was not subjected to the fluorination treatment and the cross-linking treatment, was determined. As a result, it was 0.153 GPa.

(Elemental Analysis)

Figure 2:
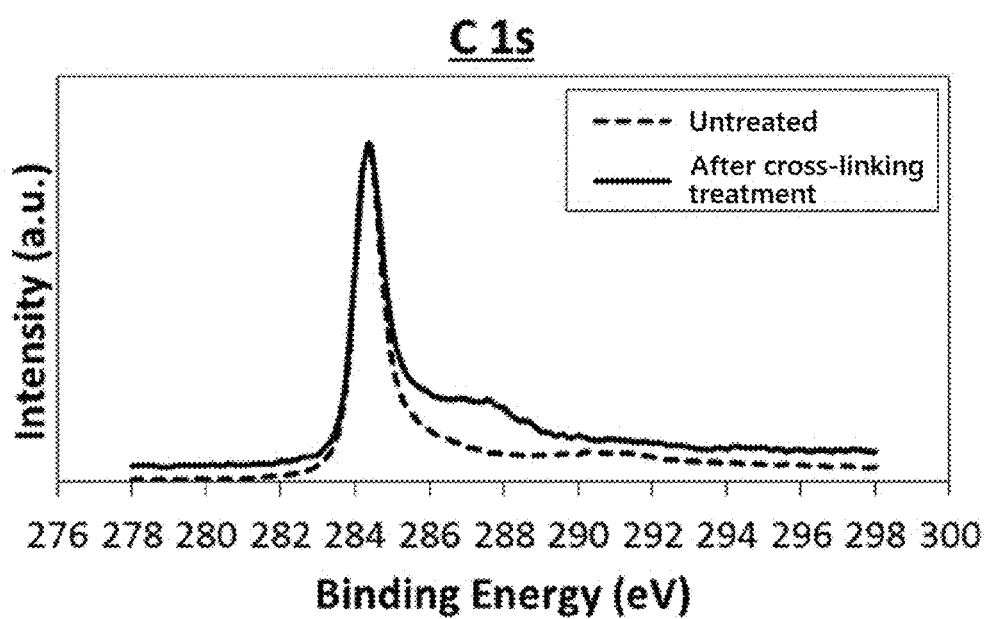
FIG. 2 is a graph showing an XPS spectrum (carbon 1s spectrum) in an untreated carbon nanotube fiber and a cross-linked structure thereof according to Examples 1 to 7 and 10 to 17 of the present invention.
Figure 3:
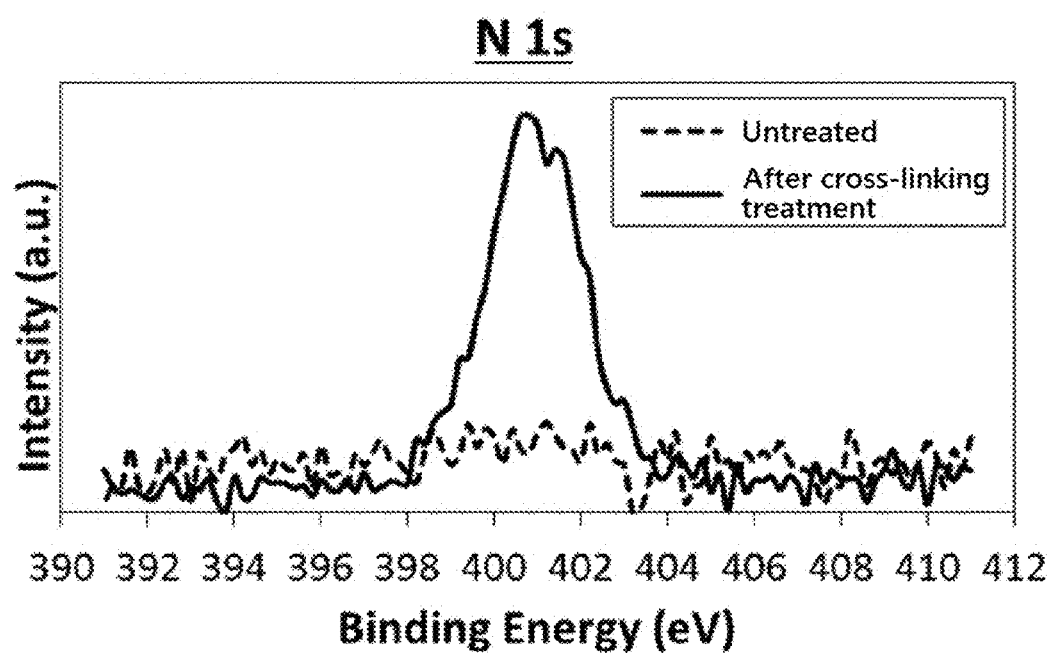
FIG. 3 is a graph showing an XPS spectrum (nitrogen is spectrum) in an untreated carbon nanotube fiber and a cross-linked structure thereof according to Examples 1 to 7 and 10 to 17 of the present invention.

Regarding the untreated carbon nanotube fibers used in Examples 1 to 8 and 11 to 18 and the cross-linked structures thereof, elemental analysis was performed using X-ray photoelectron spectroscopy (manufactured by ULVAC-PHI. INCORPORATED, trade name; PHL5000 VersaProbe II). As a result, as shown in FIGS. 2 and 3, it was confirmed by a C1s and N1s peak that a C—N bond is newly formed in these cross-linked structures. Whereby, it could be confirmed that a linking group derived from the nucleophilic compound is bonded to each cross-linked structure.

Figure 4:
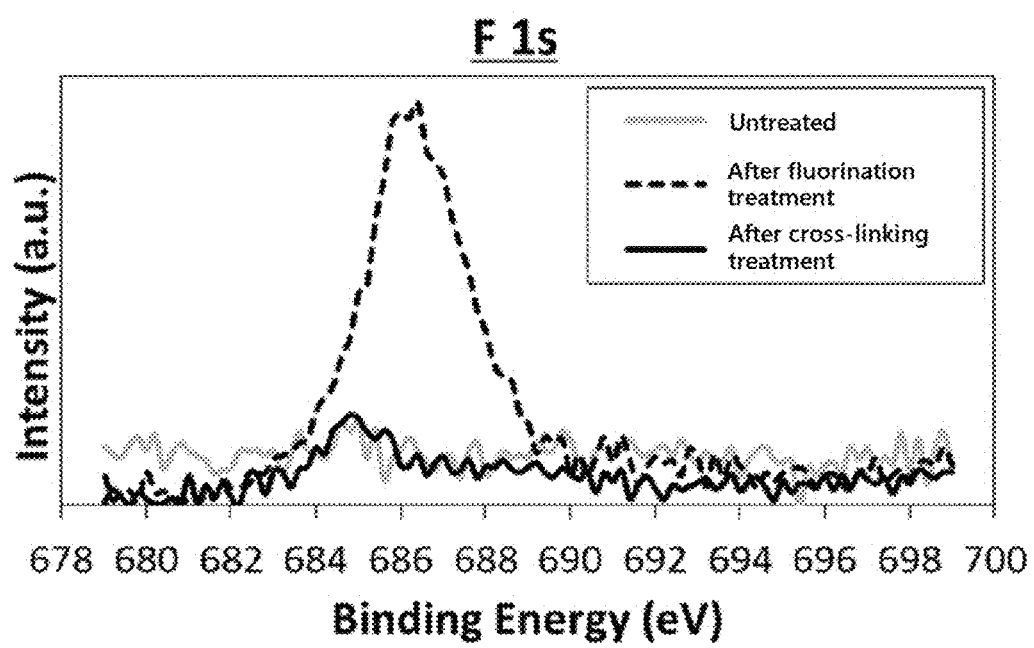
FIG. 4 is a graph showing an XPS spectrum (fluorine is spectrum) in an untreated carbon nanotube fiber, a carbon nanotube after a fluorination treatment, and a cross-linked structure thereof according to Examples 8 and 9 of the present invention.

Regarding Examples 9 and 10, as shown in FIG. 4, elemental analysis by XPS was performed with respect to the untreated carbon nanotube fiber, the carbon nanotube fiber after the fluorination treatment, and the cross-linked structure thereof. The results revealed that the C—F bond peak confirmed by the measurement of the carbon nanotube fiber after the fluorination treatment decreases after the cross-linking treatment. Whereby, it could be confirmed that the linking group derived from the nucleophilic compound is also bonded to each cross-linked structure.

Figure 5:
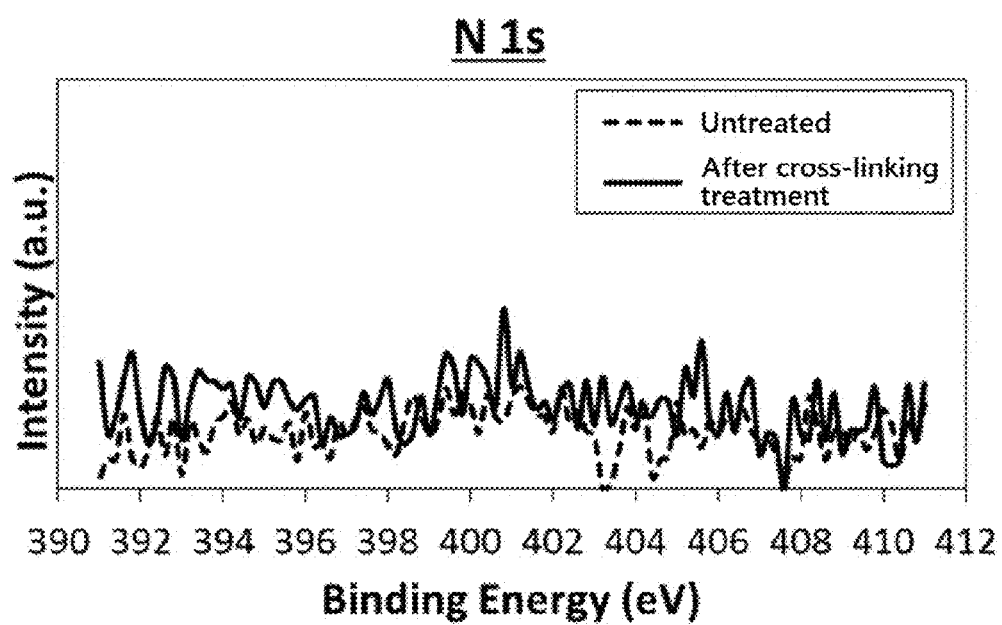
FIG. 5 is a graph showing an XPS spectrum (nitrogen is spectrum) in an untreated carbon nanotube fiber and a carbon nanotube fiber after a cross-linking treatment according to Comparative Examples 1 to 4.

Meanwhile, in Comparative Examples 1 to 4, elemental analysis by XPS was performed with respect to the untreated carbon nanotube fiber and the carbon nanotube fiber after the cross-linking treatment. As a result, as shown in FIG. 5, a peak showing formation of a C—N bond was not confirmed.

Figure 6:
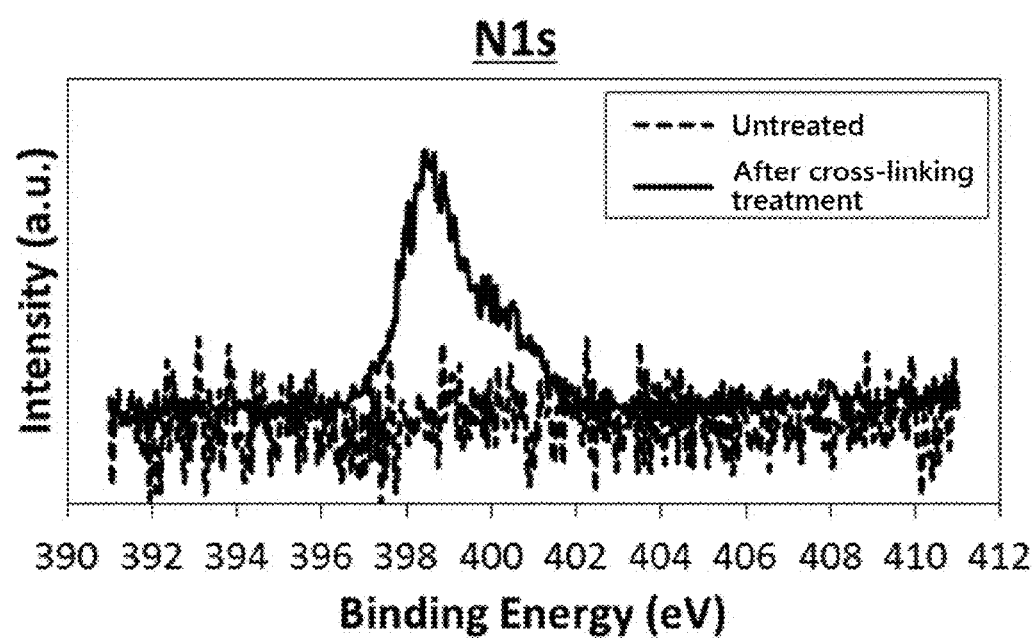
FIG. 6 is a graph showing an XPS spectrum (nitrogen is spectrum) in an untreated graphite block and a bonded site of a cross-linked structure thereof according to Examples 18 and 19 of the present invention.

Regarding Examples 19 and 20, as shown in FIG. 6, elemental analysis by XPS was performed with respect to the untreated graphite block and the cross-linked structure thereof. As a result, it could be confirmed by an N1s peak that a C—N bond is newly formed in these cross-linked structures. Whereby, it could be performed that the linking group derived from the nucleophilic compound is bonded to each cross-linked structure.

Figure 7:
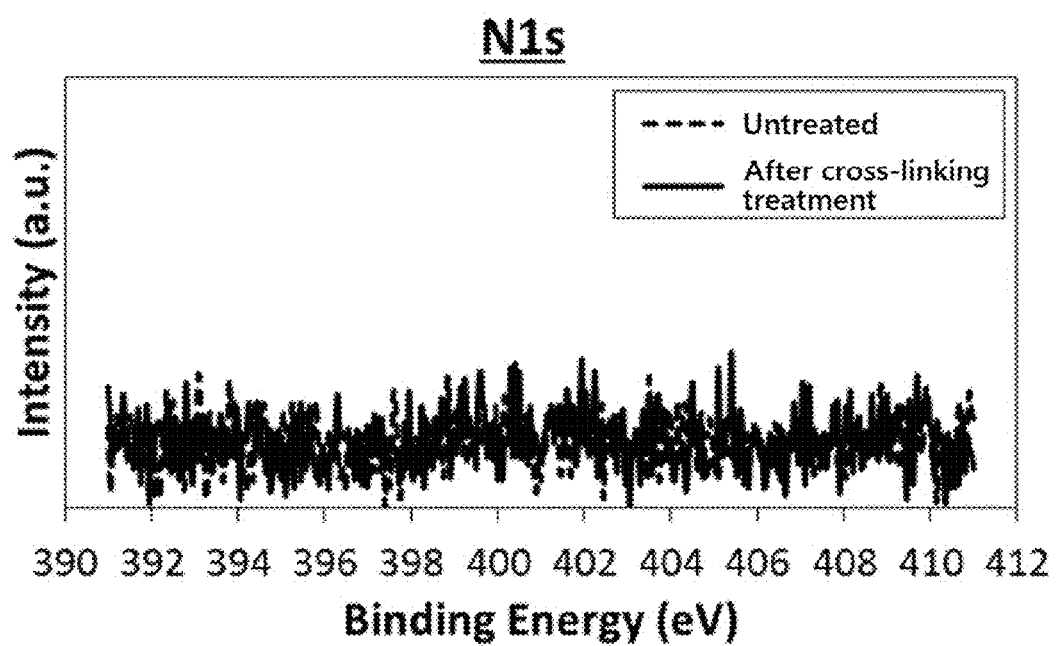
FIG. 7 is a graph showing an XPS spectrum (nitrogen is spectrum) in an untreated graphite block and a graphite block after a cross-linking treatment according to Comparative Examples 7 and 8.

Meanwhile, in Comparative Examples 7 and 8, elemental analysis by XPS was performed with respect to the untreated graphite block and the cross-linked structure thereof, as shown in FIG. 7, a peak showing formation of a C—N bond was not confirmed.

TABLE 1

| | Temperature of fluorination treatment | Cross-linking treatment | | |
|---|---|---|---|---|
| | | Nucleophilic compound | Temperature | Contact method |
| Example 1 | 25° C. | EDA | 25° C. | Immersion |
| Example 2 | 25° C. | EDA + Pyridine | 25° C. | Immersion |
| Example 3 | 50° C. | EDA | 25° C. | Immersion |
| Example 4 | 25° C. | 1,3-BAC | 25° C. | Immersion |
| Example 5 | 50° C. | 1,3-BAC | 25° C. | Immersion |
| Example 6 | 25° C. | MXDA | 25° C. | Immersion |
| Example 7 | 50° C. | MXDA | 25° C. | Immersion |
| Example 8 | 25° C. | EDA + 1,3-BAC | 25° C. | Immersion |
| Example 9 | 25° C. | Pentamethylenebis(magnesium bromide) | 25° C. | Immersion |
| Example 10 | 50° C. | Pentamethylenebis(magnesium bromide) | 25° C. | Immersion |
| Example 11 | 25° C. | EDA | 80° C. | Immersion |
| Example 12 | 25° C. | EDA | 25° C. | Gas |
| Example 13 | 25° C. | EDA | 80° C. | Gas |
| Example 14 | 25° C. | EDA | 25° C. | Gas |
| Example 15 | 25° C. | EDA | 25° C. | Gas |
| Example 16 | 25° C. | EDA | 25° C. | Gas |
| Example 17 | 25° C. | EDA | 25° C. | Gas |
| Example 18 | 25° C. | 1,3-BAC | 25° C. | Immersion |
| Comparative Example 1 | — | EDA | 25° C. | Immersion |
| Comparative Example 2 | — | EDA | 25° C. | Gas |
| Comparative Example 3 | — | 1,3-BAC | 25° C. | Immersion |
| Comparative Example 4 | — | Pentamethylenebis(magnesium bromide) | 25° C. | Immersion |
| Comparative Example 5 | 25° C. | Tridecylamine | 25° C. | Immersion |
| Comparative Example 6 | 25° C. | Pentylmagnesium chloride | 25° C. | Immersion |

| | Order of treatment | Number of treatments | Tensile strength (GPa) |
|---|---|---|---|
| Example 1 | Fluorination treatment → Cross-linking treatment | 1 | 0.282 |
| Example 2 | Fluorination treatment → Cross-linking treatment | 1 | 0.311 |
| Example 3 | Fluorination treatment → Cross-linking treatment | 1 | 0.224 |
| Example 4 | Fluorination treatment → Cross-linking treatment | 1 | 0.311 |
| Example 5 | Fluorination treatment → Cross-linking treatment | 1 | 0.227 |
| Example 6 | Fluorination treatment → Cross-linking treatment | 1 | 0.418 |
| Example 7 | Fluorination treatment → Cross-linking treatment | 1 | 0.246 |
| Example 8 | Fluorination treatment → Cross-linking treatment | 1 | 0.203 |
| Example 9 | Fluorination treatment → Cross-linking treatment | 1 | 0.388 |

TABLE 1-continued

| | | Number of treatments | Tensile strength (MPa) |
|---|---|---|---|
| Example 10 | Fluorination treatment → Cross-linking treatment | 1 | 0.194 |
| Example 11 | Fluorination treatment → Cross-linking treatment | 1 | 0.301 |
| Example 12 | Fluorination treatment → Cross-linking treatment | 1 | 0.309 |
| Example 13 | Fluorination treatment → Cross-linking treatment | 1 | 0.297 |
| Example 14 | Simultaneously | 1 | 0.241 |
| Example 15 | Cross-linking treatment→Fluorination treatment | 1 | 0.290 |
| Example 16 | Fluorination treatment → Cross-linking treatment | 2 | 0.504 |
| Example 17 | Fluorination treatment → Cross-linking treatment | 4 | 0.469 |
| Example 18 | Fluorination treatment → Cross-linking treatment | 3 | 0.415 |
| Comparative Example 1 | Only cross-linking treatment | 1 | 0.130 |
| Comparative Example 2 | Only cross-linking treatment | 1 | 0.139 |
| Comparative Example 3 | Only cross-linking treatment | 1 | 0.145 |
| Comparative Example 4 | Only cross-linking treatment | 1 | 0.139 |
| Comparative Example 5 | Fluorination treatment → Cross-linking treatment | 1 | 0.162 |
| Comparative Example 6 | Fluorination treatment → Cross-linking treatment | 1 | 0.103 |

TABLE 2

| | Types of carbon material | Temperature of fluorination treatment | Cross-linking treatment | | |
|---|---|---|---|---|---|
| | | | Nucleophilic compound | Temperature | Contact method |
| Example 19 | Graphite block + graphite block | 25° C. | EDA | 80° C. | Gas |
| Example 20 | Graphite block + MWCNT powder + graphite block | 25° C. | EDA | 80° C. | Gas |
| Comparative Example 7 | Graphite block + graphite block | — | EDA | 80° C. | Gas |
| Comparative Example 8 | Graphite block + graphite block | 25° C. | — | — | — |

| | Order of treatment | Number of treatments | Tensile strength (MPa) |
|---|---|---|---|
| Example 19 | Fluorination treatment → Cross-linking treatment | 1 | 0.012 |
| Example 20 | Fluorination treatment → Cross-linking treatment | 1 | 0.170 |
| Comparative Example 7 | Only cross-linking treatment | 1 | Not bonded |
| Comparative Example 8 | Only fluorination treatment | 1 | Not bonded |

Results

As is apparent from Table 1 and the results of elemental analysis, it was conformed that, in Examples 1 to 17, a cross-linked structure of a carbon nanotube fiber, which is excellent in tensile strength, is obtained. Particularly, as shown in Examples 15 to 17, it was confirmed that the tensile strength is further improved when a cross-linked structure of a carbon nanotube fiber is produced by performing a fluorination treatment and a cross-linking treatment plural times.

Meanwhile, in carbon nanotube fiber materials of Comparative Examples 1 to 6, the tensile strength decreases, compared to the carbon nanotube fiber produced by performing neither fluorination treatment nor cross-linking treatment, or the tensile strength is insufficient even if it increases.

As is apparent from Table 2 and the results of elemental analysis, it was confirmed that, in Examples 19 and 20, a cross-linked structure excellent in tensile strength is obtained. Particularly, in Example 20, by laminating in a state where a fluorinated carbon nanotube powder is interposed between two fluorinated graphite blocks, a cross-linked structure is formed between graphite blocks and between graphite block-carbon nanotube powders, thus extremely increasing the tensile strength.

Meanwhile, it was confirmed that a graphite block subjected to a cross-linking treatment of Comparative Example 7 and a fluorinated graphite block of Comparative Example 8 exhibit insufficient tensile strength since it was impossible to bond with each other.

What is claimed is:

1. A cross-linked structure of a carbon material, in which carbon materials are cross-linked with each other through a linking group alone, wherein the linking group consists of a nucleophilic compound having two or more nucleophilic groups in the molecule, the nucleophilic functional groups being bound with carbon atoms of the carbon materials, the cross-linked structure of the carbon material includes no hydrogen halides, and the nucleophilic compound is a compound selected from the group consisting of chain aliphatic polyamine, cycloaliphatic polyamine, aliaromatic amine, aromatic amine, Grignard reagent, alkyllithium, metal alkoxide, polyhydric alcohol, dithiol, and organic peroxide.

2. The cross-linked structure of the carbon material according to claim 1, wherein the linking group is composed of the nucleophilic compound in a state where halogen in a carbon-halogen bond existing on the surface of the carbon material, at least a surface of which is halogenated, is eliminated by a nucleophilic substitution reaction and substituted with the nucleophilic group, thereby introducing into the nucleophilic compound.

3. The cross-linked structure of the carbon material according to claim 1, wherein the carbon material is at least one selected from the group consisting of activated carbon, carbon nanohorn, carbon nanocoil, graphite, carbon black, diamond-like carbon, carbon fiber, graphene, amorphous carbon, fullerene, carbon nanotube, and diamond.

4. A method for manufacturing a cross-linked structure of a carbon material, in which carbon materials are cross-linked with each other, the method comprising the steps of:

bringing the carbon material into contact with a treatment gas containing 0.01 to 100 vol % of a halogen atom-containing gas for a treatment time in a range of 1 second to 24 hours at a treatment temperature in a range of 0° C. to 600° C., thereby subjecting a surface of the carbon material to a halogenation treatment; and bringing a nucleophilic compound having two or more nucleophilic groups in the molecule into contact with the carbon material for treatment time in a range of 1 second to 24 hours, thereby subjecting the carbon material to a cross-linking treatment and cross-linking the carbon materials with each other through a linking group alone, the linking group consisting of the nucleophilic compound, wherein the halogenation treatment and the cross-linking treatment are performed simultaneously, performed continuously in an arbitrary order, or performed by adding during any treatment, the cross-linking treatment involves the removal of hydrogen halides by-produced during the cross-linking treatment, and the nucleophilic compound is a compound selected from the group consisting of chain aliphatic polyamine, cycloaliphatic polyamine, aliaromatic amine, aromatic amine, Grignard reagent, alkyllithium, metal alkoxide, polyhydric alcohol, dithiol, and organic peroxide.

5. The method for manufacturing the cross-linked structure of the carbon material according to claim 4, which uses, as the carbon material, at least one selected from the group consisting of activated carbon, carbon nanoform, carbon nanocoil, graphite, carbon black, diamond-like carbon, carbon fiber, graphene, amorphous carbon, fullerene, carbon nanotube, and diamond.

6. The method for manufacturing a cross-linked structure of a carbon material according to claim 4, wherein the treatment temperature of the halogenation treatment is in a range of 0° C. to 100° C.

* * * * *